US012698364B2

(12) United States Patent (10) Patent No.: US 12,698,364 B2
Cottrell (45) Date of Patent: Aug. 4, 2026

(54) GEL COMPOSITIONS WITH TUNABLE HARDNESS

(71) Applicant: GelSight, Inc., Waltham, MA (US)

(72) Inventor: F. Richard Cottrell, Westport, MA (US)

(73) Assignee: GelSight, Inc., Waltham, MA (US)

( * ) Notice: Subject to any disclaimer, the term of this patent is extended or adjusted under 35 U.S.C. 154(b) by 590 days.

(21) Appl. No.: 17/959,007

(22) Filed: Oct. 3, 2022

(65) Prior Publication Data

US 2023/0031758 A1 Feb. 2, 2023

Related U.S. Application Data

(63) Continuation of application No. PCT/US2021/025682, filed on Apr. 3, 2021.

(60) Provisional application No. 63/005,001, filed on Apr. 3, 2020.

(51) Int. Cl.
| | |
|---|---|
| *B29C 35/08* | (2006.01) |
| *B29C 71/02* | (2006.01) |
| *C08J 3/075* | (2006.01) |
| *C08J 3/20* | (2006.01) |
| *C08J 3/24* | (2006.01) |
| *C08J 7/04* | (2020.01) |

(52) U.S. Cl.
CPC .............. *C08J 3/075* (2013.01); *C08J 3/203* (2013.01); *C08J 3/24* (2013.01); *C08J 7/04* (2013.01); *C08J 7/08* (2013.01); *C08J 2300/14* (2013.01); *C08J 2375/04* (2013.01)

(58) Field of Classification Search
CPC . B29C 35/0888; B29C 35/08; B29C 39/0026; B29C 2043/025
See application file for complete search history.

(56) References Cited

U.S. PATENT DOCUMENTS

| | | | | |
|---|---|---|---|---|
| 5,952,397 | A | * | 9/1999 | Fujiki .................. B29C 33/405 |
| | | | | 528/33 |
| 2001/0033136 | A1 | * | 10/2001 | Kawase ............... H10K 71/231 |
| | | | | 313/506 |
| 2005/0075427 | A1 | | 4/2005 | Campbell et al. |
| 2005/0075463 | A1 | | 4/2005 | Zarnoch et al. |
| 2009/0186958 | A1 | | 7/2009 | St Clair |
| 2009/0202791 | A1 | | 8/2009 | Nakamura et al. |

(Continued)

FOREIGN PATENT DOCUMENTS

| | | | | |
|---|---|---|---|---|
| WO | WO-2018165206 | A1 | * | 9/2018 ............. G01B 11/30 |
| WO | WO-2021203074 | | | 10/2021 |

OTHER PUBLICATIONS

Donlon, E., et al., GelSlim: A High-Resolution, Compact, Robust, and Calibrated Tactile-sensing Finger, 2018 IEEE/RSJ International Conference on Intelligent Robots and Systems (IROS) (Oct. 1-5, 2018), pp. 1927-1934.*

(Continued)

*Primary Examiner* — Matthew J Daniels
(74) *Attorney, Agent, or Firm* — Strategic Patents, P.C.

(57) ABSTRACT

Gel compositions have a tunable hardness controlled by exposure to an external stimulus. Further disclosed herein are methods for making such gel compositions and devices that use such gel compositions. In one aspect, the gel compositions can be used to prepare physical 3-D replicas of the topography of a target surface.

21 Claims, 2 Drawing Sheets

(56) References Cited

U.S. PATENT DOCUMENTS

| | | | |
|---|---|---|---|
| 2012/0245272 A1* | 9/2012 | Dent ...................... | C08G 77/50 |
| | | | 524/502 |
| 2016/0121597 A1 | 5/2016 | Lingier et al. | |
| 2016/0297943 A1 | 10/2016 | Däschlein et al. | |

OTHER PUBLICATIONS

WIPO, "PCT Application No. PCT/US21/25682 International Preliminary Report on Patentability mailed Oct. 13, 2022", 10 pages.
ISA/US, "PCT Application No. PCT/US21/25682 International Search Report and Written Opinion mailed Aug. 23, 2021", 13 pages.

* cited by examiner

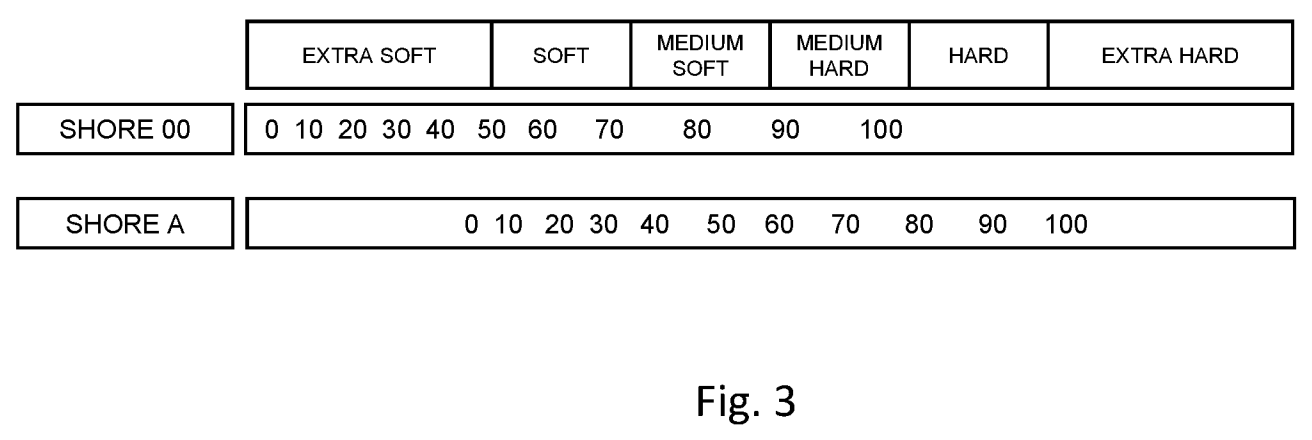

| SHORE 00 | EXTRA SOFT | SOFT | MEDIUM SOFT | MEDIUM HARD | HARD | EXTRA HARD |
|---|---|---|---|---|---|---|
| | 0 10 20 30 40 | 50 60 70 | 80 | 90 | 100 | |

| SHORE A | 0 10 20 30 40 | 50 60 70 | 80 | 90 | 100 |
|---|---|---|---|---|---|

Fig. 3

GEL COMPOSITIONS WITH TUNABLE HARDNESS

CROSS-REFERENCE TO RELATED APPLICATIONS

This application is a bypass continuation that claims priority to International Patent Application No. PCT/US21/25682 filed on Apr. 3, 2021, which claims priority to U.S. Provisional Patent Application No. 63/005,001 filed on Apr. 3, 2020, where the entire content of each of the foregoing is incorporated herein by reference.

FIELD OF THE INVENTION

The present invention generally relates to gel compositions with tunable hardness which can be used, for example, to produce high resolution replicas of surfaces and their methods of making and using thereof.

BACKGROUND OF THE INVENTION

Thermosetting resins are commonly used to make replicas of surfaces. Generally two viscous liquid components are weighed or measured and mixed and applied to a surface to be replicated and allowed to cure to a solid replica of the surface.

Applying the thermosetting resin material to the surface can be troublesome as bubbles can form during mixing of the ingredients and bubbles can be formed and trapped against the surface during application. The thermosetting resin materials are viscous and flow from the surface can occur after application and before cure especially on vertical and overhead surfaces.

Typically, the surface to be replicated generally requires the application of a release agent to prevent adhesion of the replicating resin from binding to the surface. The application of the release agent is itself troublesome generally requiring the correct amount and the correct drying. Further, this replication process requires time to adequately cure.

For purposes of replicating a surface with a thermosetting material, a plasticizer must be included to soften the thermoplastic elastomer while maintaining its elastic nature. However, there are practical limits to the amount of plasticizer which can be added. The thermoplastic elastomer may have a limited adsorption capability resulting in separation of the plasticizer from the polymer. Blooming of the plasticizer to the surface of the elastomer is a potential issue as well. The plasticizer could degrade the desirable mechanical properties of the mixture resulting in low strength or even flow.

Plasticizers are typically lower molecular weight materials and commonly a liquid at room conditions. To be effective, the plasticizer needs to form a homogenous solution with a polymer but not eliminate the crystallinity or the glassy structures that hold such thermoplastics together. This balance of solubilizing properties where one part of the elastomeric polymer molecules are solubilized while maintaining the rigid parts is difficult. In practice, this limits the selection of materials that can be effectively used as a plasticizer and limits the amount that can be used for any specific thermoplastic.

Thus, there exists a need for compositions and methods which can be used to prepare replicas of surfaces that avoid the issues known with known thermosetting resin materials, as described above.

Therefore, it is an object of the invention to provide gel compositions with tunable hardness.

It is a further object of the invention to provide optically transparent gel compositions which can be used to replicate target surfaces and which can be rapidly converted to a harder gel product.

It is still a further object of the invention to provide methods of making and using gel compositions with tunable hardness.

SUMMARY OF THE INVENTION

Gel compositions have a tunable hardness controlled by exposure to an external stimulus. Further disclosed herein are methods for making such gel compositions and devices that use such gel compositions. In one aspect, the gel compositions can be used to prepare physical 3-D replicas of the topography of a target surface.

Optically transparent gel compositions, which are initially soft, and present on a transparent support can be pressed against a surface to be replicated have been developed. The surface to be replicated can be visualized through the optically transparent 3-D gel and optically transparent support in order to ensure conformity of the gel to the surface's topography. The degree of conformance can be judged visually and adjustments in position or application pressure of the 3-D gel made until it is desired to cure/harden/freeze the 3-D gel by activation with a suitable stimulus. Activation with the stimulus induces the soft 3-D gel on the surface to be converted into a rigid/hardened 3-D replica of the surface's (complex) topography.

The gel compositions can be formed from suitable thermoplastic polymers or elastomer materials which include, but are not limited to, polyurethanes, siloxanes, silicone rubbers, polyamides, polyesters, polyolefins, natural rubbers, or mixtures thereof. The weight average molecular weights of the thermoplastic polymers or elastomer materials is preferably high being between about 100 kDa and 2000 kDa, or any subrange disclosed therein. In a preferred embodiment, the elastomer material is a polyurethane elastomer. In some instances, commercially available polyurethanes can be used, such as but not limited to BASF ELASTOLLAN® grades: Soft35A12P000, Soft45A12P000, 1160A13P, 1170A10, and EXP BCF35A12PTSG. In some instances, the thermoplastic polymers or elastomers exclude polystyrene block copolymers.

The gel compositions further include one or more suitable multifunctional plasticizers (as described below) in sufficient amount to form a soft gel. For example, the hardness of the plasticized gel composition is between about 0 to about 85, about 0 to about 75, about 0 to about 70, about 0 to about 65, about 0 to about 55, about 0 to about 50, about 0 to about 45, about 0 to about 40, about 0 to about 35, about 0 to about 30, about 0 to about 25, about 0 to about 20, about 0 to about 15, about 0 to about 10, or about 0 to about 5 on the Shore 00 scale. In certain instances, the hardness of the plasticized gel composition is about 30 to about 55 on the Shore 00 scale. In some instances, the hardness of the plasticized gel composition is about 0, 10, 20, 30, 40, 50, 60, 70, 80, or 85 on the Shore 00 scale. Hardness as measured, e.g., using the Shore 00 scale as described herein, may vary according to location. In this context, the Shore 00 hardness of the soft gel composition may be measured at a surface of the soft gel composition. It may also be measured at any other suitable location.

As described below, the multifunctional plasticizers can be reacted by exposure to a suitable stimulus to harden the soft gel composition by incorporating into the gel composition an initiator (such as a photoinitiator) which makes it is possible to cure the soft gel into a rigid/hard solid by activation through the transparent support of the appropriate wavelength or by E-beam exposure. By inducing reaction of the multifunctional plasticizers the initially soft gel can be cured/hardened to a hardness of about between about 60 to about 100, about 70 to about 100, about 80 to about 100, or about 90 to about 100 on the Shore A scale. In some instances, the hardness of the hardened gel composition is about 60, 65, 70, 75, 80, 85, 90, 91, 92, 93, 94, 95, 96, 97, 98, 99, or 100 on the Shore A scale. Hardness as measured, e.g., using the Shore A scale as described herein, may vary according to location. In this context, the Shore A hardness of the cured hardened gel composition may be measured at a surface of the cured hardened gel composition. It may also be measured at any other suitable location.

The initially soft gel compositions contain multifunctional plasticizers which can be cured and undergo a polymerization or crosslinking reaction in situ to harden the soft gel. The polymerization or crosslinking reaction may employ a free radical reaction utilizing the reaction between reactive functional groups, such as vinyl or acrylate groups, present on the multifunctional plasticizers. This reaction may be activated by exposure to an external stimulus, such as by exposure to light, radiation (such as ultraviolet), electron beams, heat, chemical additives, and combinations thereof which induce polymerization or crosslinking of the multifunctional plasticizer components to produce toughening or hardening of the initially soft gel compositions.

To effectively transform a high molecular weight thermoplastic elastomer into a soft or softened elastomer gel the amounts of multifunctional plasticizers which can be used are typically in the range of between about 50% to 95%, 50% to 90%, 50% to 85%, 50% to 80%, 50% to 75%, 50% to 70%, 50% to 65%, or 50% to 60% by weight in the total weight of the plasticized polymer including any additional components such as stabilizer, initiator, or other optional additives. In some other instances, the weight ratio of thermoplastic polymer-to-multifunctional plasticizer(s) is about 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, or 1:3. In still some other instances, the weight ratio of thermoplastic polymer-to-multifunctional plasticizer(s) is about 1:1 to about 1:9 and any possible subrange contained therein.

The multifunctional plasticizers described contain at least two or more functional reactive groups or sites within each molecule. For example, these can be carbon-carbon double bond groups, such as vinyl groups, in styrene, acrylate groups, vinyl chloride, butadiene, isoprene, etc. The multifunctional plasticizers with or without stabilizer (vide infra) should be stable to any degree of heating required in preparing or processing the gel compositions. The multifunctional plasticizers can be low molecular weight compounds of less than 2000 Da, 1000 Da, 750 Da, or 500 Da. The multifunctional plasticizers are typically liquid but can in some instances be solid powders.

In some instances, acrylates are preferred because of the availability of broad array and diversity of starting materials containing two or more vinyl groups. The multifunctional plasticizers may be bifunctional diacrylate compounds or trifunctional triacrylate compounds, or compounds having higher numbers of such functionalities. In some instances commercially available acrylate polymers can be used. For example, SARTOMER® acrylate monomers: SR238, SR351H and SR 9209A can serve as multifunctional plasticizers. SARTOMER® monomers SR238 and SR9209A are difunctional containing two acrylate groups per molecule whereas SARTOMER® SR351H is trifunctional. The more functional groups the greater the ability to create a more rigid solid structure upon polymerizing. With at least about 50 to 75% or more of the gel composition composed of these multifunctional plasticizers the resulting conversion of the soft gel to a rigid solid hard gel results in a very hard solid replica. The SARTOMER® monomers are believed to be effective as multifunctional plasticizers because they share an aliphatic ester/ether structure. Accordingly, other multifunctional plasticizers which share such an aliphatic ester/ether structure and at least two acrylate functional groups are also envisioned to function as multifunctional plasticizers.

In addition to the multifunctional plasticizers described above, the gel compositions further include one or more initiators, which upon exposure to a stimulus (a suitable ultraviolet (UV) light, electron beam, actinic exposure, can be used to induce the polymerization or crosslinking of the multifunctional plasticizers in the soft gel composition) cause the multifunctional plasticizers to react, such as by polymerization or crosslinking, and harden the initially soft gel composition.

In some instances, the initiator is a photoinitiator such as, BAPO, or IRGACURE® 819, having a peak adsorption at 380 nm extending out into the blue region. Any suitable photoinitiator known in the art may be employed. Other exemplary photoinitiators include, but are not limited to, 2,2-dimethoxy-2-phenylacetophenone (DMPA) and diphenyl(2,4,6-trimethylbenzoyl)phosphine oxide (TPO). For photoinitiators, a suitable stimulus such as ultraviolet (UV) light, electron beam, actinic exposure, can be used to induce the polymerization or crosslinking of the multifunctional plasticizers in the soft gel composition.

In some other instances, thermal free-radical initiators may in some instances also be used such as benzoyl peroxide (BPO) and azobisisobutyronitrile (AIBN). For thermal free-radical initiators, the soft gel composition can be heated with a suitable heat source (i.e., oven, heat gun, etc.) to induce the polymerization or crosslinking of the multifunctional plasticizers in the soft gel composition.

The amount of the one or more initiators present in the soft gel composition may be in the range of between about 0.1 to 5, 0.1 to 2.5, 0.1 to 1 percent by weight of the composition. In some instances, the amount is about 0.1, 0.5, 1, 2, 3, 4, or 5 percent by weight of the composition.

In addition to the multifunctional plasticizers described above, the gel compositions further include one or more optional stabilizers to prevent premature thermal polymerization when the gel composition is prepared with heating. Exemplary, but non-limiting, stabilizers include: phenothiazine, hydroquinone, 4-methoxyphenol, and methylhydroquinone. Such stabilizers can also be free radical inhibitors. Atmospheric oxygen can also act as a stabilizer to prevent thermal polymerization. Monomers may also be stabilized by the manufacturer. Any suitable stabilizer known in the art may be employed.

The amount of the one or more stabilizers present in the soft gel composition may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more stabilizers present in the soft gel composition may be in the range of between about 0.1 to 3, 0.1 to 2.5, 0.1 to 1 percent by weight of the total composition. In some instances, the amount is about 0.1, 0.5, 1, 2, or 3 percent by weight of the total composition.

In some instances, in addition to the multifunctional plasticizers, initiators, and stabilizers described above, the gel compositions may further comprise one or more optional additives including, but not limited to conventional plasticizers, such as an oil, diethylsuberate, glycertriacetate (triacetin), dioctyl phthalate, dibutyl adipate, tris(2-butoxyethyl) phosphate, or acetyltributylcitrate, a tackifier, or any other suitable additives or other constituents. In some instances, the soft gel compositions may exclude any additives listed here or any further additives. In some instances, the soft gel compositions are formed exclusively of thermoplastic polymer(s), plasticizer(s), initiator(s), and stabilizer(s).

The amount of the one or more optional additives present in the soft gel composition may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more optional additives present in the soft gel composition may be in the range of between about 0.1 to 50, 0.1 to 30, 0.1 to 15, 0.1 to 10, 0.1 to 3, or 1 to 3 percent by weight of the total composition. In some instances, the amount is about 0.1, 0.5, 1, 2, 3, 5, 10, 20, 30, 40, or 50 percent by weight of the total composition.

In some instances, in order to improve the ability of the replica gel to faithfully conform to a topographically complex target surface, the gel composition must stretch, slide, and/or distort to match the target surface topography. If the gel composition has a high coefficient of friction (COF), the gel composition may not readily slide into and over the features of a target surface, and may not easily conform to the target surface. In addition, in some instances the gel compositions may prevent trapped air from escaping. For example, if a gel composition is pressed onto a pit, it will form a seal around the rim of the pit, thereby trapping air within the pit. The trapped air can prevent the gel composition from reaching to the bottom of the pit, and thus prevents accurate replication of the topography in its entirety. Thus, the 3-D replica gels can further include one or more optional modifications, as described below, in order to mitigate the aforementioned issues to provide a low coefficient of friction and to prevent trapping air.

Methods of preparing the soft gel compositions described can include the steps of:
- (a) mixing one or more thermoplastic polymers; one or more multifunctional plasticizers; one or more initiators; and optionally one or more stabilizers;
- (b) heating the mixture to form a molten composition;
- (c) coating or casting the molten composition onto an optically transparent substrate; and
- (d) allowing the molten composition to cool to form a soft gel composition present on the optically transparent substrate.

In some other instances, the methods of preparing the soft gel compositions can include the steps of:
- (a') mixing one or more thermoplastic polymers; one or more multifunctional plasticizers; one or more initiators; and optionally one or more stabilizers;
- (b') heating the mixture to form a molten composition;
- (c') casting the molten composition into a mold optionally comprising an optically transparent substrate;

- (d') allowing the molten composition to cool to form a soft gel composition;
- (e') removing the mold to release a soft gel composition present on the optional optically transparent substrate.

The thickness of the soft gel composition formed by the methods described can have any arbitrary thickness. The gel composition may be cast in a mold to determine a desired thickness. For example, the thickness may be about 0.1 to 10 mm, 0.1 to 7.5 mm, 0.1 to 5 mm, or 0.1 to 3 mm thick. In some other instances, an injection molding process can be used for casting the gel composition when molten. The mold, when used, can have any suitable shape or dimensions necessary to provide a soft gel composition disposed on an optically transparent substrate. By way of use of a mold, in some instances, it is possible to shape the contact surface of the soft gel composition to be rounded or domed to permit maximal pressure to be applied at or near the center of the domed soft gel composition when applied to a target surface.

The heating of steps (b) or (b') can be carried out at about 100 to 250° C., 100 to 200° C., or 100 to 150° C. In some instances, heating is carried out at about 100° C., 150° C., 200° C., or 250° C. The heating time may be within a range of between about 5 to 120 min, 5 to 60 min, 5 to 45 min, or 5 to 30 min. The heating time is sufficient to produce a homogeneous molten mixture. The heating may be carried out under air or may be carried out under inert atmosphere, such as argon or nitrogen.

In some instances, following steps (d) or (e') above, a plurality of particles may be added to the contact surface of the soft gel composition formed according to the methods described. This can be achieved, for example, by a further step of applying an adhesive contact layer where a plurality of particles (as described above) are brushed on or otherwise deposited thereon by any suitable means. In still other instances, the plurality of particles could be brushed on or otherwise deposited directly on the contact surface of the soft gel composition following steps (d) or (e') by any suitable means when the contact surface is itself adhesive and/or tacky.

To effectively transform a high molecular weight thermoplastic polymer into a soft or softened gel composition the amounts of multifunctional plasticizers which can be used in the mixture prepared in step (a) and (a') methods described are typically in the range of between about 50% to 95%, 50% to 90%, 50% to 85%, 50% to 80%, 50% to 75%, 50% to 70%, 50% to 65%, or 50% to 60% by weight to the total weight of the mixture. In some other instances, the weight ratio of thermoplastic polymer-to-multifunctional plasticizer(s) is selected to be about 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, or 1:3. In still some other instances, the weight ratio of thermoplastic polymer-to-multifunctional plasticizer(s) is about 1:1 to about 1:9 and any possible subrange contained therein.

The multifunctional plasticizers which can be used according to the methods described above contain at least two or more functional reactive groups or sites within each molecule. For example, these can be carbon-carbon double bond groups, such as vinyl groups, in styrene, vinyl chloride, butadiene, isoprene, etc. The multifunctional plasticizers with or without stabilizer (vide infra) should be stable to any degree of heating required in preparing or processing the gel compositions. The multifunctional plasticizers can be low molecular weight compounds of less than 2000 Da, 1000 Da, 750 Da, or 500 Da. The multifunctional plasticizers are typically liquid but can in some instances be solid powders.

In some instances, acrylates are preferred because of the availability of broad array and diversity of starting materials containing two or more acrylic groups. In some instances commercially available acrylate polymers can be used. For example, SARTOMER® acrylate monomers: SR238, SR351H and SR 9209A can serve as multifunctional plasticizers. SARTOMER® monomers SR238 and SR9209A are difunctional containing two acrylate groups per molecule whereas SARTOMER® SR351H is trifunctional. The more functional groups the greater the ability to create a more rigid solid structure upon polymerizing. With at least about 50 to 75% or more of the gel composition composed of these multifunctional plasticizers the resulting conversion of the soft gel to a rigid solid hard gel results in a very hard solid replica. The SARTOMER® monomers are believed to be effective as multifunctional plasticizers because they share an aliphatic ester/ether structure. Accordingly, other multifunctional plasticizers which share such an aliphatic ester/ether structure and at least two acrylate functional groups are also envisioned to function as multifunctional plasticizers.

In addition to the multifunctional plasticizers described above, the soft gel compositions prepared according to the methods above further include one or more initiators, which upon exposure to a stimulus cause the multifunctional plasticizers to react, such as by polymerization or crosslinking, and harden the initially soft gel composition.

In some instances, the initiator is a photoinitiator such as, BAPO, or IRGACURE® 819, having a peak adsorption at 380 nm extending out into the blue region. Any suitable photoinitiator known in the art may be employed. Other exemplary photoinitiators include, but are not limited to, 2,2-dimethoxy-2-phenylacetophenone (DMPA) and diphenyl(2,4,6-trimethylbenzoyl)phosphine oxide (TPO).

In some other instances, thermal free-radical initiators may in some instances also be used such as benzoyl peroxide (BPO) and azobisisobutyronitrile (AIBN).

The amount of the one or more initiators which are added to the mixture of step (a) or (a') is selected to afford a soft gel composition containing the initiator in the range of between about 0.1 to 5, 0.1 to 2.5, 0.1 to 1 percent by weight of the composition. In some instances, the amount is about 0.1, 0.5, 1, 2, 3, 4, or 5 percent by weight of the soft gel composition formed.

In addition to the multifunctional plasticizers described above, the gel compositions further include one or more stabilizers to prevent premature thermal polymerization when the gel composition is prepared with heating. Two exemplary, but non-limiting, stabilizers include: phenothiazine, hydroquinone, 4-methoxyphenol, and methylhydroquinone. Such stabilizers can also be free radical inhibitors. Atmospheric oxygen can also act as a stabilizer to prevent thermal polymerization. Monomers may also be stabilized by the manufacturer. Any suitable stabilizer known in the art may be employed.

The amount of the one or more stabilizers added to the mixture of step (a) or (a') may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more stabilizers which can added to the mixture of step (a) or (a') may be in the range of between about 0.1 to 3, 0.1 to 2.5, 0.1 to 1 percent by weight of the total composition. In some instances, the amount is about 0.1, 0.5, 1, 2, or 3 percent by weight of the total composition.

In some instances, in addition to the multifunctional plasticizers, initiators, and stabilizers described above, the gel compositions may further comprise one or more optional additives including, but not limited to conventional plasticizers, such as an oil, diethylsuberate, glyceryltriacetate (triacetin), or acetyltributylcitrate, a tackifier, or any other suitable additives or other constituents. In some instances, the soft gel compositions may exclude any additives listed here or any further additives. In some instances, the soft gel compositions are formed exclusively of thermoplastic polymer(s), initiator(s), and stabilizer(s).

The amount of the one or more optional additives which can added to the mixture of step (a) or (a') may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more optional additives which can added to the mixture of step (a) or (a') may be in the range of between about 0.1 to 50, 0.1 to 30, 0.1 to 15, 0.1 to 10, 0.1 to 3, or 1 to 3 percent by weight of the total composition. In some instances, the amount is about 0.1, 0.5, 1, 2, 3, 5, 10, 20, 30, 40, or 50 percent by weight of the total composition.

The soft gel compositions can be cured and undergo a polymerization or crosslinking reaction in situ to harden the soft gel. The polymerization or crosslinking reaction typically employs a free radical reaction by way of the reaction between reactive functional groups, such as vinyl or acrylic groups, present on the multifunctional plasticizers. This reaction may be activated by exposure to an external stimulus, such as by exposure to light, radiation (such as ultraviolet), electron beams, heat, chemical additives, and combinations thereof which induce polymerization or crosslinking of the multifunctional plasticizer components to produce toughening or hardening of the initially soft gel compositions.

Accordingly, a non-limiting method of curing/hardening the soft gel compositions described herein and prepared by either the first or second methods above include the step of:

(a''') exposing a soft gel composition to an external stimulus to polymerize and/or crosslink the multifunctional plasticizers and cure the soft gel composition into a hard gel composition.

In still some other instances, the soft gel compositions may be used to form a 3-dimensional replica of a target surface using the soft gel compositions described above according to a non-limiting method including the steps of:

(a'''') contacting and pressing a soft gel composition onto a target surface;

(b'''') optionally visualizing and optionally repositioning the soft gel composition to ensure total or substantially (e.g., at least about 95%, 96%, 97%, 98%, 99%, or greater surface contact) total contact to the topography of the target surface;

(c'''') exposing the soft gel composition on the target to an external stimulus to polymerize and/or crosslink the multifunctional plasticizers and cure the soft gel composition into a hard gel composition; and (d'''') removing the hard gel composition from the target surface wherein the hard gel composition is a topographical replica of the target surface.

The exposing step may proceed by an external stimulus selected from UV light, electron beam, actinic exposure, or other suitable stimulus to induce the polymerization or crosslinking of the multifunctional plasticizers in the soft gel composition.

By inducing reaction of the multifunctional plasticizers the initially soft gel composition is cured/hardened to a hardness of about between about 60 to about 100, about 70 to about 100, about 80 to about 100, or about 90 to about 100 on the Shore A scale. In some instances, the hardness of the hardened gel composition is about 60, 65, 70, 75, 80, 85, 90, 91, 92, 93, 94, 95, 96, 97, 98, 99, or 100 on the Shore A scale.

The soft gel compositions may be formed or cast into a mold and cured to final desired shape by a method including the steps of:

(i) mixing one or more thermoplastic polymers; one or more multifunctional plasticizers; one or more initiators; and optionally one or more stabilizers;

(ii) heating the mixture to form a molten composition;

(iii) casting the mixture into a mold;

(iv) optionally allowing the mixture to cool to form a soft gel composition;

(v) exposing the mixture or the soft gel composition to an external stimulus to polymerize and/or crosslink the multifunctional plasticizers and cure the soft gel composition into a hard gel composition; and (e') removing the mold to release the soft gel composition having the shape of the mold.

BRIEF DESCRIPTION OF THE DRAWINGS

FIG. 3 shows Shore 00 and Shore A scales relative to each other.

DESCRIPTION OF THE INVENTION

Figures 1, 2A, 2B:
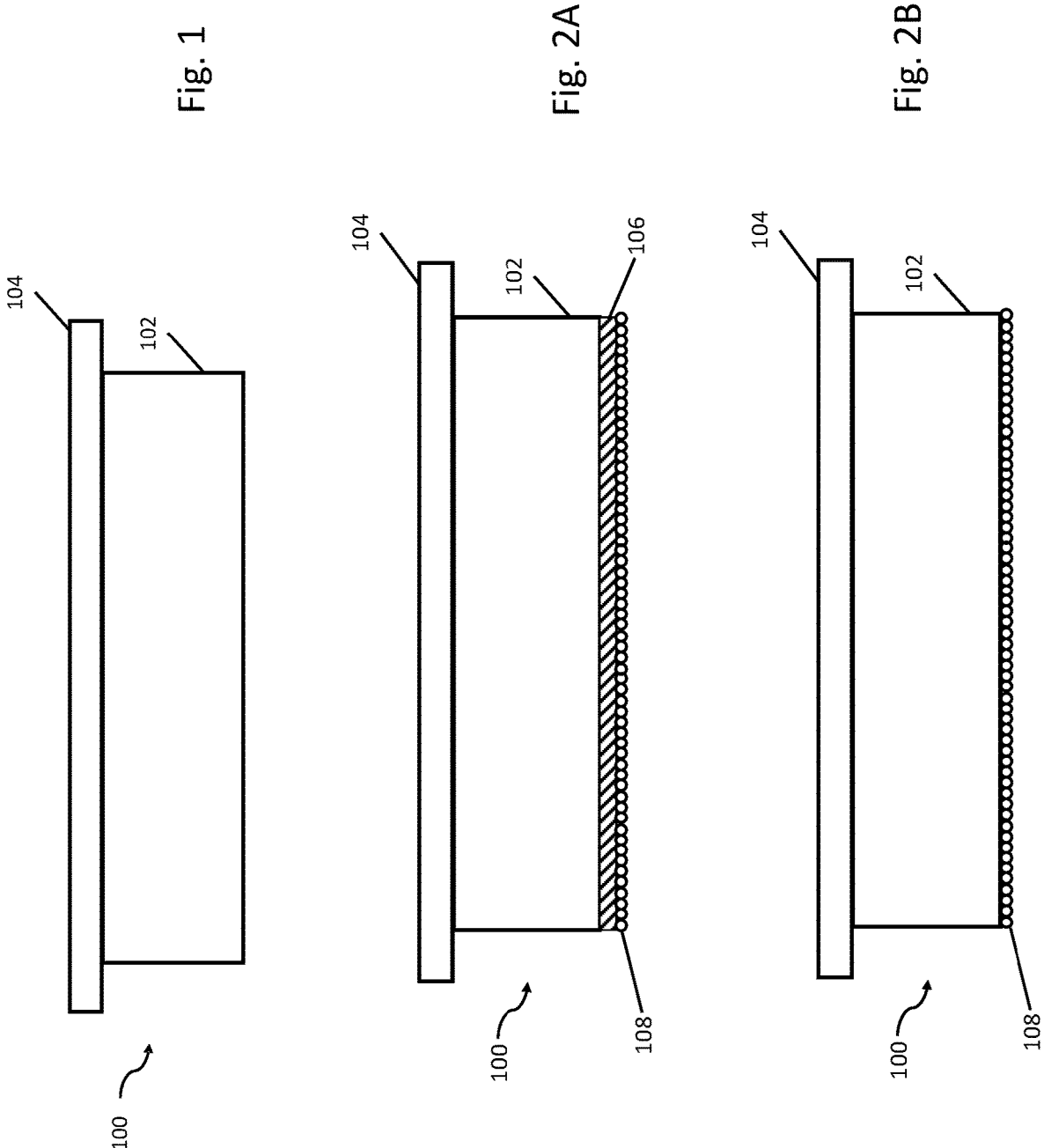
FIG. 1 shows a non-limiting cross-sectional view of a gel pad 100 having a soft gel composition 102 disposed on an optically transparent substrate 104.
FIG. 2A shows a non-limiting cross-sectional view of a gel pad 100 having a soft gel composition 102 disposed on an optically transparent substrate 104 and having an optional contact layer 106 on a surface of the soft gel composition 100 and a plurality of particles 108 on the contact layer.
FIG. 2B shows a non-limiting cross-sectional view of a gel pad 100 having a soft gel composition 102 disposed on an optically transparent substrate 104 and a plurality of particles 108 present on a surface of the soft gel composition 102.

Gel compositions with tunable hardness by exposure to an external stimulus and methods of making and using thereof are described herein.

I. Definitions

"Elastomer," as used herein, refers to a polymer having viscoelastic properties.

"Curable," "Curing," "Cured," as used herein, refers polymeric or oligomeric materials or compositions thereof capable of being toughened or hardened typically by crosslinking of polymer and/or oligomer chains therein. "Curing," as used herein refers to the process of applying an external stimulus, such as, but not limited to light, radiation, electron beams, heat, chemical additives, and combinations thereof which induce polymerization or crosslinking of components to produce toughening or hardening of the compositions.

"Conforms," as used herein refers to the ability of a soft elastomeric material to conform, adapt, or deform when the material is contacted, typically under an applied pressure, to a target surface such that efficient conformance to the topography and geometry, such as asperities, curvature, and/or non-planarity, of the target surface results in sufficient or high contact areas at the interfaces between the one or more surfaces and the material.

"Refractive index," as used herein, refers to a dimensionless number of a material which is understood to be the ratio of the speed of electromagnetic radiation in free space to the speed of the radiation in the respective material.

Numerical ranges include ranges of temperatures, ranges of molecular weights, ranges of integers, ranges of times, ranges of thicknesses, etc. The disclosed ranges of any type, disclose individually each possible number that such a range could reasonably encompass, as well as any sub-ranges and combinations of sub-ranges encompassed therein. For example, disclosure of a Shore A or Shore 00 hardness range is intended to disclose individually every possible hardness value or range of values that such a range could encompass, consistent with the disclosure herein. For example, a curing step described herein may be carried out for a period of time in the range of about 5 min to 30 min, which also refers to time values that can be selected independently from about 5, 6, 7, 8, 9, 10, 11, 12, 13, 14, 15, 16, 17, 18, 19, 20, 21, 22, 23, 24, 25, 26, 27, 28, 29, and 30 minutes, as well as any range between these numbers (for example, 10 min to 20 min), and any possible combination of ranges between these time values.

The term "about" or "approximately" as used herein generally means within 20%, preferably within 10%, and more preferably within 5% of a given value or range, and/or within a range that one or ordinary skill would expect to work for the intended or explicitly stated purpose. The term "about" unless indicated otherwise modifies both end points of a range and all numbers within a range or listing.

II. Replica Gel Compositions

Optically transparent gel compositions, which are initially soft, and present on a transparent support can be pressed against a surface to be replicated have been developed. The surface to be replicated can be visualized through the optically transparent 3-D gel and optically transparent support in order to ensure conformity of the gel to the surface's topography. The degree of conformance can be judged visually and adjustments in position or application pressure of the 3-D gel made until it is desired to cure/harden/freeze the 3-D gel by activation with a suitable stimulus. Activation with the stimulus induces the soft 3-D gel on the surface to be converted into a rigid/hardened 3-D replica of the surface's (complex) topography.

A. Gel Compositions

The gel compositions for three-dimensional replication described can be formulated by plasticizing thermoplastic polymers or elastomers. Such plasticized materials can be referred to as thermoplastic elastomers or TPEs.

The gel compositions can be formed from suitable thermoplastic polymers or elastomer materials which include, but are not limited to, polyurethanes, siloxanes, silicone rubbers, polyamides, polyesters, polyolefins, natural rubbers, or mixtures thereof. The weight average molecular weights of the thermoplastic polymers or elastomer materials is preferably high being between about 100 kDa and 2000 kDa, or any subrange disclosed therein. In a preferred embodiment, the elastomer material is a polyurethane elastomer. In some instances, commercially available polyurethanes can be used, such as but not limited to BASF ELASTOLLAN® grades: Soft35A12P000, Soft45A12P000, 1160A13P, 1170A10, and EXP BCF35A12PTSG. In some instances, the thermoplastic polymers or elastomers exclude polystyrene block copolymers.

The gel compositions further include one or more suitable multifunctional plasticizers (as described below) in sufficient amount to form a soft gel. For example, the hardness of the plasticized gel composition is between about 0 to about 85, about 0 to about 75, about 0 to about 70, about 0 to about 65, about 0 to about 55, about 0 to about 50, about 0 to about 45, about 0 to about 40, about 0 to about 35, about 0 to about 30, about 0 to about 25, about 0 to about 20, about 0 to about 15, about 0 to about 10, or about 0 to about 5 on the Shore 00 scale. In certain instances, the hardness of the plasticized gel composition is about 30 to about 55 on the Shore 00 scale. In some instances, the hardness of the plasticized gel composition is about 0, 10, 20, 30, 40, 50, 60, 70, 80, or 85 on the Shore 00 scale. Hardness as measured, e.g., using the Shore 00 scale as described herein (see FIG. 3), may vary according to location. In this context, the Shore 00 hardness of the soft gel composition may be measured at a surface of the soft gel composition. It may also be measured at any other suitable location.

As described below, the multifunctional plasticizers can be reacted by exposure to a suitable stimulus to harden the soft gel composition by incorporating into the gel composition an initiator (such as a photoinitiator) which makes it is possible to cure the soft gel into a rigid/hard solid by activation through the transparent support of the appropriate wavelength or by E-beam exposure. By inducing reaction of the multifunctional plasticizers the initially soft gel can be cured/hardened to a hardness of about between about 60 to about 100, about 70 to about 100, about 80 to about 100, or about 90 to about 100 on the Shore A scale. In some instances, the hardness of the hardened gel composition is about 60, 65, 70, 75, 80, 85, 90, 91, 92, 93, 94, 95, 96, 97, 98, 99, or 100 on the Shore A scale. Hardness as measured, e.g., using the Shore A scale as described herein (see FIG. 3), may vary according to location. In this context, the Shore A hardness of the cured hardened gel composition may be measured at a surface of the cured hardened gel composition. It may also be measured at any other suitable location.

As noted above, the initially soft gel composition 102 having a Shore A hardness at or below 15, as described above, is typically disposed on an optically transparent substrate 104 to form a replica gel pad 100, as shown in FIG. 1. As shown in FIG. 1, one surface of the soft gel composition is in contact with the substrate whereas the opposing surface serves as a contact surface which can be contacted to a target surface to be replicated. The optically transparent substrate 104, can be formed of any optically clear material such as an acrylate (such as polymethylmethacrylate (PMMA)), a glass, or a polycarbonate. The substrate may have any suitable shape and any suitable thickness, which may be about 0.1 to 10 mm, 0.1 to 7.5 mm, 0.1 to 5 mm, or 0.1 to 3 mm thick. The optically transparent substrate 104 also permits the application of force to engage the initially soft gel composition 104 with a target surface in a manner that permits replication of the topography of the target surface. The optically transparent substrate 104 may be rigid or deformable but needs to be capable of transmitting light there through to facilitate visualizing how the soft gel, when pressed onto the target surface, is conforming to the topography of the target surface. The optically transparent substrate 104 may be flat or it may be curved to any suitable curvature. In some instances, a soft gel composition may be formed on a flat substrate and the substrate may then be curved. The complete topography and details of the target surface will be replicated when the soft gel is pressed at a sufficient pressure and then upon exposure of the soft gel composition to a suitable activation stimulus, the multifunctional plasticizers present in the initially soft gel composition react to harden the gel composition to a Shore A hardness at or above 60, as described above. Once hardened the gel composition can be removed from the target surface and a replica of the surface topography of the target surface will be replicated in the hardened gel composition.

The thickness of the gel composition when soft (prior to hardening) or when hard (after curing) may have any arbitrary thickness. The gel composition may be cast in a mold to determine a desired thickness. For example, the thickness may be about 0.1 to 10 mm, 0.1 to 7.5 mm, 0.1 to 5 mm, or 0.1 to 3 mm thick. In some other instances, an injection molding process can be used for casting the gel composition when molten.

In some instances, the soft gel composition is illustrated as substantially flat. However, other shapes are also envisioned. For example, the surface of the soft gel composition may be rounded or domed to permit maximal pressure to be applied at or near the center of the domed soft gel composition when applied to a target surface. This can result in improved contact to the target surface and improved ability to replicate the complexity of a surface topography. Forming other shapes for the soft gel composition can be achieved using molds with desired geometries into which the molten gel composition is cast into.

The gel composition, when soft or after hardening, is preferably optically clear and transmits all or substantially all visible light through the soft gel. The optically transparent substrate also transmits all or a substantial amount of visible light through the substrate. "Substantial amount," as used herein refers to transmission of greater than 50%, 60%, 70%, 80%, 90%, 95%, 96%, 97%, 98%, 99%, or greater of light of a given wavelength or range of wavelengths through the gel composition. In some instances, the gel composition may have a slight yellow color and may absorb light in the blue region of the visible spectrum believed to be due to the presence of the one or more initiators.

1. Multifunctional Plasticizers

The initially soft gel compositions contain multifunctional plasticizers which can be cured and undergo a polymerization or crosslinking reaction in situ to harden the soft gel. The polymerization or crosslinking reaction may employ a free radical reaction utilizing the reaction between reactive functional groups, such as vinyl or acrylate groups, present on the multifunctional plasticizers. This reaction may be activated by exposure to an external stimulus, such as by exposure to light, radiation (such as ultraviolet), electron beams, heat, chemical additives, and combinations thereof which induce polymerization or crosslinking of the multifunctional plasticizer components to produce toughening or hardening of the initially soft gel compositions.

Thermoplastic polymers, such as used herein to form the curable gel compositions, can become molten when heated and become solids when cooled. The mechanism of the thermal transition can either proceed by crystallization or glass formation or both. Elastomeric thermoplastics described herein are materials with soft segments and hard segments. The soft segments are generally amorphous, the hard segments are the crystallization regions or the glassy regions polymer network or both.

The multifunctional plasticizers which can be used act as low molecular weight diluents which soften the thermoplastic polymer, such as polyurethane, to which they are added to. They are believed to function by association primarily with the amorphous (soft) phase of the polymer network. The multifunctional plasticizers are effective to increase softness and elasticity and lower the mechanical strength of the polymer's network. That is, it requires less force to stretch the polymeric material to its elastic limit and the material is softer to touch or deformation.

The multifunctional plasticizers described herein should be able to create a homogenous mixture with the molten thermoplastic polymers described. If a mixture of the polymer and the multifunctional plasticizers are heated above the glass transition or the melting temperature of the thermoplastic polymer and mixed, the mixture formed should be homogenous. In some instances, it may also be possible to create a mixture of multifunctional plasticizers and thermoplastic polymer by dissolution of both in an appropriate solvent and evaporation of the solvent. In this way heating can be avoided in making the mixture. With the avoidance of heating, it may be possible to introduce thermal initiators, as described below, into the gel compositions.

The multifunctional plasticizers described herein should be able to form a strong association with the thermoplastic polymer. That is, the plasticized thermoplastic polymer at room temperature should be a homogenous softened polymer gel composition. The surface(s) of the plasticized polymers should preferably be free of unassociated plasticizer and preferably without any apparent surface wetness, slime, or other surface impurities.

The multifunctional plasticizers described herein should be stable in the plasticized polymer over time and temperature and preferably demonstrate no oozing or surface blooming. Blooming can result from an incompatibility of a plasticizer combined with a given polymer where the plasticized mixture, which is slowly coming to equilibrium, can exude the plasticizer. Blooming can be avoided or minimized by having a better compatibility (equilibrium) of the plasticizer and polymer materials.

The multifunctional plasticizers should not eliminate the crystallinity (i.e., degree of structural order which may be present) or the glassy state (i.e., the state which exists below the glass transition temperature) which hold the thermoplastic polymers together. The mechanical integrity of the plasticized polymer is dependent on the existence of these regions. The multifunctional plasticizer can reduce the size and/or amount of these regions but should not eliminate these regions. The affinity or compatibility of the multifunctional plasticizer with the soft regions cannot destroy the regions holding the polymer structure together.

To effectively transform a high molecular weight thermoplastic elastomer into a soft or softened elastomer gel the amounts of multifunctional plasticizers which can be used are typically in the range of between about 50% to 95%, 50% to 90%, 50% to 85%, 50% to 80%, 50% to 75%, 50% to 70%, 50% to 65%, or 50% to 60% by weight in the total weight of the plasticized polymer including any additional components such as stabilizer, initiator, or other optional additives. In some other instances, the weight ratio of thermoplastic polymer-to-multifunctional plasticizer(s) is about 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, or 1:3. In still some other instances, the weight ratio of thermoplastic polymer-to-multifunctional plasticizer(s) is about 1:1 to about 1:9 and any possible subrange contained therein. With increasing amounts of multifunctional plasticizer the hardness on the Shore 00 or Shore A scale of the thermoplastic polymer can be tuned and decreased for the soft gel composition or increased to the desired hardness for the cured hard gel composition, as described above.

The plasticized thermoplastic polymer which forms a replica gel used in the Examples must have sufficient mechanical stability and strength and be capable of repeated elastic deformations without degradation. The plasticized thermoplastic polymer prior to and following curing should be optically clear or have minimal transmission haze (representing scattering of light from a surface (i.e., less than about 3%, 2%, 1% scattering of visible light by the gel composition). Some haze may be associated with crystalline regions of the polymer but there should not be any inhomogeneity otherwise that would scatter light. Further, the plasticized thermoplastic polymer which forms a replica gel should be free or substantially free (less than 1%, 0.5%, or 0.1% by volume) of any bubbles. The gel composition should be free of any bubbles by visual inspection.

The multifunctional plasticizers are typically monomer molecules which are capable of polymerization into a rigid solid. The multifunctional plasticizer is readily polymerizable and capable of conversion from a low molecular weight, low viscosity solid or liquid into a rigid solid. Typically, that requires crosslinking into a three-dimensional molecular structure.

The multifunctional plasticizers described contain at least two or more functional reactive groups or sites within each molecule. For example, these can be carbon-carbon double bond groups, such as vinyl groups, in styrene, acrylate groups, vinyl chloride, butadiene, isoprene, etc. The multifunctional plasticizers with or without stabilizer (vide infra) should be stable to any degree of heating required in preparing or processing the gel compositions. The multifunctional plasticizers can be low molecular weight compounds of less than 2000 Da, 1000 Da, 750 Da, or 500 Da. The multifunctional plasticizers are typically liquid but can in some instances be solid powders.

In some instances, acrylates are preferred because of the availability of broad array and diversity of starting materials containing two or more vinyl groups. The multifunctional plasticizers may be bifunctional diacrylate compounds or trifunctional triacrylate compounds, or compounds having higher numbers of such functionalities. In some instances commercially available acrylate polymers can be used. For example, SARTOMER® acrylate monomers: SR238, SR351H and SR 9209A can serve as multifunctional plasticizers. SARTOMER® monomers SR238 and SR9209A are difunctional containing two acrylate groups per molecule whereas SARTOMER® SR351H is trifunctional. The more functional groups the greater the ability to create a more rigid solid structure upon polymerizing. With at least about 50 to 75% or more of the gel composition composed of these multifunctional plasticizers the resulting conversion of the soft gel to a rigid solid hard gel results in a very hard solid replica. The SARTOMER® monomers are believed to be effective as multifunctional plasticizers because they share an aliphatic ester/ether structure. Accordingly, other multifunctional plasticizers which share such an aliphatic ester/ether structure and at least two acrylate functional groups are also envisioned to function as multifunctional plasticizers.

Stable soft gel compositions with a Shore 00 hardness of about 0 to about 85 containing as high as 75% by weight acrylate monomer, or a ratio of about 1:3 to about 1:9 thermoplastic polymer-to-multifunctional plasticizer (weight:weight) can be formed.

The multifunctional plasticizers, such as acrylate monomers, are also able to create interpenetrating polymer networks when the monomers are polymerized within the thermoplastic polymer network, such as formed from polyurethane elastomer.

2. Initiators

In addition to the multifunctional plasticizers described above, the gel compositions further include one or more initiators, which upon exposure to a stimulus (a suitable ultraviolet (UV) light, electron beam, actinic exposure, can be used to induce the polymerization or crosslinking of the multifunctional plasticizers in the soft gel composition) cause the multifunctional plasticizers to react, such as by polymerization or crosslinking, and harden the initially soft gel composition.

In some instances, the initiator is a photoinitiator such as, BAPO, or IRGACURE® 819, having a peak adsorption at 380 nm extending out into the blue region. Any suitable photoinitiator known in the art may be employed. Other exemplary photoinitiators include, but are not limited to, 2,2-dimethoxy-2-phenylacetophenone (DMPA) and diphenyl(2,4,6-trimethylbenzoyl)phosphine oxide (TPO). For photoinitiators, a suitable stimulus such as ultraviolet (UV) light, electron beam, actinic exposure, can be used to induce the polymerization or crosslinking of the multifunctional plasticizers in the soft gel composition. For example, a 10-watt hand held blue light (420 nm to 480 nm) can be used.

In some other instances, thermal free-radical initiators may in some instances also be used such as benzoyl peroxide (BPO) and azobisisobutyronitrile (AIBN). For thermal free-radical initiators, the soft gel composition can be heated with a suitable heat source (i.e., oven, heat gun, etc.) to induce the polymerization or crosslinking of the multifunctional plasticizers in the soft gel composition.

The amount of the one or more initiators present in the soft gel composition may be in the range of between about 0.1 to 5, 0.1 to 2.5, 0.1 to 1 percent by weight of the composition. In some instances, the amount is about 0.1, 0.5, 1, 2, 3, 4, or 5 percent by weight of the composition.

Other photoinitiators can include, for example, benzil, a benzoin compound (e.g., a benzoin ether), a benzyl ketal, an α-dialkoxyacetophenone, an α-hydroxyalkylphenones, an α-aminoalkylphenones, an acyl-phosphine oxide, a benzophenone, a benzoamine, a thioxanthone, a thioamine, and a titanocene. The photoinitiator can be a cationic photoinitiator. In some examples, the photoinitiator can be 2,2-dimethoxy-2-phenylacetophenone (DMPA), benzoyl peroxide, or 2-hydroxy-2-methyl-1-phenyl-1-propanone (HMPP). The photoinitiator can be benzoin, benzoin ethyl ether, benzoin methyl ether, 4,4'-dimethoxybenzoin, 4,4'-dimethylbenzil, 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, diphenyl(2,4,6-trimethylbenzoyl)phosphine oxide/2-hydroxy-2-methylpropiophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzophenone, benzophenone-3,3',4,4'-tetracarboxylic dianhydride, 4-benzoylbiphenyl, 4,4'-bis(diethylamino)benzophenone, 4,4'-bis[2-(1-propenyl)phenoxy]benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, Michler's ketone, bis(4-tert-butylphenyl)iodonium perfluoro-1-butanesulfonate, bis(4-tert-butylphenyl)iodonium p-toluenesulfonate, bis(4-tert-butylphenyl)iodonium triflate, Boc-methoxyphenyldiphenylsulfonium triflate, (4-bromophenyl)diphenylsulfonium triflate, (tert-Butoxycarbonylmethoxynaphthyl)-diphenylsulfonium triflate, (4-tert-Butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, N-hydroxynaphthalimide triflate, N-hydroxy-5-norbornene-2,3-dicarboximide perfluoro-1-butanesulfonate, (4-iodophenyl)diphenylsulfonium triflate, (4-methoxyphenyl)diphenylsulfonium triflate, 2-(4-methoxystyryl)-4,6-bis(trichloromethyl)-1,3,5-triazine, (4-methylphenyl)diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-Phenylthiophenyl)diphenylsulfonium triflate, triarylsulfonium hexafluoroantimonate salt, triarylsulfonium hexafluorophosphate salt, triphenylsulfonium perfluoro-1-butanesufonate, triphenylsulfonium triflate, tris(4-tert-butylphenyl)sulfonium perfluoro-1-butanesulfonate, tris(4-tert-butylphenyl)sulfonium triflate, anthraquinone-2-sulfonic acid sodium salt monohydrate, 2-tert-butylanthraquinone, camphorquinone, diphenyl(2,4,6-trimethylbenzoyl)phosphine oxide, 9,10-phenanthrenequinone, phenylbis(2,4,6-trimethylbenzoyl) phosphine oxide, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, or thioxanthen-9-one.

Curing reactions between the multifunctional plasticizers present in the soft gel composition can be used to fully cure or a substantially cure the gel composition to the desired Shore A hardness (see above), wherein "substantially" refers to a percentage of curing of at least about 60%, 65%, 70%, 75%, 80%, 85%, 90%, 91%, 92%, 93%, 94%, 95%, 96%, 97%, 98%, or 99%. The degree of curing can be limited by steric considerations presented by the close proximity of functional groups on the multifunctional plasticizer molecules.

3. Stabilizers

In addition to the multifunctional plasticizers described above, the gel compositions further include one or more optional stabilizers to prevent premature thermal polymerization when the gel composition is prepared with heating. Exemplary, but non-limiting, stabilizers include: phenothiazine, hydroquinone, 4-methoxyphenol, and methylhydroquinone. Such stabilizers can also be free radical inhibitors. Atmospheric oxygen can also act as a stabilizer to prevent thermal polymerization. Monomers may also be stabilized by the manufacturer. Any suitable stabilizer known in the art may be employed.

The amount of the one or more stabilizers present in the soft gel composition may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more stabilizers present in the soft gel composition may be in the range of between about 0.1 to 3, 0.1 to 2.5, 0.1 to 1 percent by weight of the total composition. In some instances, the amount is about 0.1, 0.5, 1, 2, or 3 percent by weight of the total composition.

4. Optional Additives

In some instances, in addition to the multifunctional plasticizers, initiators, and stabilizers described above, the gel compositions may further comprise one or more optional additives including, but not limited to conventional plasticizers, such as an oil, diethylsuberate, glycertriacetate (triacetin), dioctyl phthalate, dibutyl adipate, tris(2-butoxyethyl) phosphate, or acetyltributylcitrate, a tackifier, or any other suitable additives or other constituents. In some instances, the soft gel compositions may exclude any additives listed here or any further additives. In some instances, the soft gel compositions are formed exclusively of thermoplastic polymer(s), plasticizer(s), initiator(s), and stabilizer(s).

In one aspect, an optional additive such as a non-functional plasticizer or other multifunctional plasticizer or the like may usefully be added in order to moderate the cured hardness of the gel. For example, a cured gel that is too rigid may be difficult to separate from certain surfaces that are being replicated, such as surfaces having rough textures or complex, compound shapes. In this case, a non-functional plasticizer such as a compound that contains carbon and hydrogen but does not include the functional groups described herein, may be added to reduce the cured hardness of the gel after curing/polymerization as described herein. For example, while a Shore A hardness of about 60 to about 65 may be useful in some contexts, the Shore A hardness of the cured gel may advantageously be reduced to about 50 or lower when creating replicas of certain shapes or materials. Thus in one aspect, the cured gel composition may have a Shore A hardness of about 50 or a Shore A hardness of about 50 or lower, and the gel may include a non-functional plasticizer, or any other additive suitable for softening the cured gel for easier removal from a target surface after curing.

The amount of the one or more optional additives present in the soft gel composition may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more optional additives present in the soft gel composition may be in the range of between about 0.1 to 50, 0.1 to 30, 0.1 to 15, 0.1 to 10, 0.1 to 3, or 1 to 3 percent by weight of the total composition. In some instances, the amount is about 0.1, 0.5, 1, 2, 3, 5, 10, 20, 30, 40, or 50 percent by weight of the total composition.

B. Low Friction and Air Egress

In some instances, in order to improve the ability of the replica gel to faithfully conform to a topographically complex target surface, the gel composition must stretch, slide, and/or distort to match the target surface topography. If the gel composition has a high coefficient of friction (COF), the gel composition may not readily slide into and over the features of a target surface, and may not easily conform to the target surface. In addition, in some instances the gel compositions may prevent trapped air from escaping. For example, if a gel composition is pressed onto a pit, it will form a seal around the rim of the pit, thereby trapping air within the pit. The trapped air can prevent the gel composition from reaching to the bottom of the pit, and thus prevents accurate replication of the topography in its entirety. Thus, the 3-D replica gels can further include one or more optional modifications, as described below, in order to mitigate the aforementioned issues to provide a low coefficient of friction and to prevent trapping air.

The soft gel compositions may optionally include a contact layer 106 which includes a plurality of particles 108 coupled on the contact layer 106, as shown in FIG. 2A. The particles preferably have a hardness greater than the hardness of the soft gel composition so that the particles 108 can retain their shape when the soft gel composition is applied to a target surface with sufficient force to deform the soft gel composition to replicate the surface's topography. In some other instances, as shown in FIG. 2B, the plurality of particles 108 can be optionally adhered directly to the surface of the soft gel composition by using an aqueous polyurethane dispersion which can be added between the plurality of particles by, for example, a spin coating process. Alternatively, the plurality of particles 108 can be optionally adhered directly to the surface of the soft gel composition if the surface is sufficiently tacky or adhesive alone.

The array of particles 108 can create air channels for redistribution and egress of air or other trapped gasses when the soft gel composition is applied to a target surface. In order to retain the structure of air channels, the pattern may usefully form a single layer of the particles on the contact layer 106. The particles may have a Shore A hardness greater than 40, or more generally, greater than a corresponding hardness of the soft gel composition, as defined above and prior to hardening.

The inclusion of particles as described herein, present a relatively low coefficient of friction so that the contact surface of the soft gel composition can more readily conform to the target surface without artifacts introduced by gripping and/or trapping of air or gasses. The particles can also provide air channels for the egress of air or other gasses or fluids as the contact surface of the soft gel composition surrounds and moves into topographically varied regions of the target surface, such as a recess that might otherwise trap gas or other fluid in a manner that interferes with accurate replication of the target surface.

Any suitable number of particles can be arranged in a pattern to cover some or all of a contact surface of the soft gel composition. The size and shape of the particles may vary according to an intended use. The diameter of the particles may, for example, be between one and twenty five microns. In general, the pattern of the particles on the contact surface may form a closely spaced array, which may be a regular array, such as a square or hexagonal array, or an irregular array. The pattern may be a substantially hexagonal array, e.g., generally hexagonal with various interstitial irregularities that do not prevent most of the particles from contacting six other adjacent particles. The pattern may also or instead include a plurality of locally hexagonal arrays coupled by other arrays of particles that span the regions between otherwise hexagonal regions. Irregular patterns, may also or instead be used, provided that the particles are sufficiently close to one another to rigidly maintain physical channels there between for egress of gas(ses) when the contact surface of the soft gel composition is pressed/applied against a target surface to be replicated.

The pattern of particles may form interstitial channels that permit a flow of air between the particles on the contact surface of the soft gel composition in order to avoid trapped pockets of air or other gas that might otherwise interfere with replication of the complexities of the topography of the target surface. Furthermore, the particles may generally contact one another within the pattern, e.g., in direct contact, or the particles may be separated, either due to a lower packing density or because the particles are physically separated by a layer of adhesive or interstitial elastomer.

The particles may have a variety of size ranges and distributions. In one aspect, the particles are monodisperse, or substantially monodisperse. The particles may more specifically be monodisperse spheres so that the particles tend to arrange within a plane into a substantially hexagonal array. In one aspect, the particles may have an average diameter of about one, two, three, four, five, six, seven, eight, nine, or ten microns. In another aspect, the particles may have an average diameter in a range between three and ten microns, or between one and twenty five microns.

In another aspect, the particles may include non-spherical particles with a largest diameter within the ranges noted above. In general, any such shape may be used provided the shapes do not pack in such a dense manner that interstitial channels for the escape of air become occluded. Polydisperse particles may also or instead be used. For example, the particles may be polydisperse with a first standard deviation about a mean particle size defining a range falling within a range of one to ten microns. The degree of polydispersity may be characterized in other ways. For example, a dimensionless metric such as the coefficient of variation (cv) or relative standard deviation may be used:

$$c_v = \sigma/\mu \qquad \text{(Eq. 1)}$$

where $\sigma$ is the standard deviation for a distribution of particle sizes and $\mu$ is the mean. These values are commonly reported by commercial providers of bulk microspheres and other particles of interest.

The particles may be formed of a variety of materials including polymers, natural polymers, and minerals. For example, the particles may usefully be formed of, or include, polymethylsilsesquioxane. Polymethyl-silsesquioxane (PMSQ) provides certain advantages when used as particles in the contact surface of the soft gel composition. PMSQ has a relatively low coefficient of friction, it is rigid, and microspheres of PMSQ are readily commercially available in narrow size distributions. However, non-spherical particles may also or instead be used, and the particles may usefully be formed of other types of materials. For example, the particles may be formed of polysilicone, a silica, a glass, a melamine, a polystyrene, a polymethyl-methacrylate, a polybutylmethacrylate, a styrene/acrylate copolymer, a cellulose, and a polylactic acid. The particles may also or instead be formed of a nylon or a polytetrafluoroethylene. More generally, any rigid material that is available in suitable sizes and shapes may be used as particles in a contact surface as contemplated herein. Other suitable and commercially available microparticles include but are not limited to microspheres formed of polysilicone, methyl methacrylate crosspolymer, polybutyl acrylate and silica, lauryl methacrylate/glycol dimethacrylate crosspolymer and acrylates/ethylhexyl acrylate/dimethicone methacrylate copolymer, HDIItrimethylol hexyllactone crosspolymer and silica, HDIItrimethylol hexyllactone crosspolymer and silica, ethylene/acrylic acid copolymer, polyethylene, nylon-6, nylon-12, calcium silicate, vinyl dimethicone/methicone silsesquioxane crosspolymer, and combinations thereof.

The particles may be at least partially embedded in the contact layer 106 is formed of an adhesive, such as a polyurethane, or the particles are otherwise coupled to the contact layer through one or more intermediate layers. In some instances, the contact layer 106 is the soft gel composition formed or is formed of the same material. In some instances, the particles may extend out of the adhesive in order to benefit from any associated, low coefficient of friction, as well as the resulting interstitial channels, although the amount of the particles extending beyond the adhesive may depend on a number of factors, such as the strength of the adhesive and the shape of the particles. In one aspect, the particles may be spherical particles, and may extend by at least one half of their diameter above the layer of adhesive attaching the particles to the contact layer 106.

Alternatively or in addition to the particles described above, the contact layer may optionally include non-planar features forming interstitial channels that permit a flow of air between the non-planar features. These non-planar features may have a hardness greater than the initially soft gel composition without affecting the transfer the topography of a target surface into the soft gel composition pressed onto the surface upon contact.

The non-planar features may also or alternatively include pillars extending from the contact layer. The hardness of the non-planar features may be greater than the contact layer and the soft gel composition. The non-planar features may generally extend normal to the surface of the contact layer, e.g., with vertical walls, or the non-planar features may be curved, angled, or otherwise variably shaped along an axis parallel to the substrate normal.

For example, an array of non-planar protrusions can be molded directly into the contact layer by constructing a mold of an array of small depressions and filling the depressions with a material that cures to provide a relatively hard surface with a relatively low coefficient of friction. These filled depressions can then be transferred and attached to the contact surface layer at which point they form an array of non-planar features providing similar advantages to the particles also described.

In some instances, the non-planar features may include tapered structures which, for example, include pyramids, cones, truncated cones, or any other tapered structures or the like.

The plurality of particles and/or non-planar features, when present, on the soft gel composition are preferably translucent. When the soft gel composition is pressed onto a target surface any haze which may be present prior to application of pressure will disappear as the pressure is increased on contact allowing for a clear image of the target surface to be visualized through the gel composition and substrate prior to and after inducing hardening of the gel composition to form a replica of the surface.

III. Methods of Preparing Gel Compositions

A non-limiting example of the methods of preparing the soft gel compositions described herein includes the steps of:

(a) mixing one or more thermoplastic polymers; one or more multifunctional plasticizers; one or more initiators; and optionally one or more stabilizers;

(b) heating the mixture to form a molten composition;

(c) coating or casting the molten composition onto an optically transparent substrate; and (d) allowing the mixture to cool to form a soft gel composition present on the optically transparent substrate.

A second non-limiting example of the methods of preparing the soft gel compositions described herein includes the steps of:

(a') mixing one or more thermoplastic polymers; one or more multifunctional plasticizers; one or more initiators; and optionally one or more stabilizers;

(b') heating the mixture to form a molten composition;

(c') casting the molten composition into a mold optionally comprising an optically transparent substrate;

(d') allowing the mixture to cool to form a soft gel composition;

(e') removing the mold to release a soft gel composition present on the optional optically transparent substrate.

The soft gel compositions used in the methods can be formed from suitable thermoplastic polymers or elastomer materials which include, but are not limited to, polyurethanes, siloxanes, silicone rubbers, polyamides, polyesters, polyolefins, natural rubbers, or mixtures thereof. The weight average molecular weights of the thermoplastic polymers or elastomer materials is preferably high being between 100 kDa and 2000 kDa, or any subrange disclosed therein. In a preferred embodiment, the thermoplastic polymer is a polyurethane elastomer. In some instances, commercially available polyurethanes can be used, such as but not limited to BASF ELASTOLLAN® grades: Soft35A12P000, Soft45A12P000, 1160A13P, 1170A10, and EXP BCF35A12PTSG. In some instances, the thermoplastic polymers or elastomers exclude polystyrene block copolymers.

The optically transparent substrate of the aforementioned methods can be formed of any optically clear material such as an acrylate (such as polymethylmethacrylate (PMMA)), a glass, or a polycarbonate. The substrate may have any suitable shape and any suitable thickness, which may be about 0.1 to 10 mm, 0.1 to 7.5 mm, 0.1 to 5 mm, or 0.1 to 3 mm thick. The optically transparent substrate may be flat or it may be curved to any suitable curvature. In some instances, a soft gel composition may be formed on a flat substrate and the substrate may then be curved. In steps (c) or (c') typically the molten composition covers all of side or surface of the optically transparent substrate but it is possible to cover only a portion thereof, if desired.

The thickness of the soft gel composition formed by the methods described can have any arbitrary thickness. The gel composition may be cast in a mold to determine a desired thickness. For example, the thickness may be about 0.1 to 10 mm, 0.1 to 7.5 mm, 0.1 to 5 mm, or 0.1 to 3 mm thick. In some other instances, an injection molding process can be used for casting the gel composition when molten. The mold, when used, can have any suitable shape or dimensions necessary to provide a soft gel composition disposed on an optically transparent substrate. By way of use of a mold, in some instances, it is possible to shape the contact surface of the soft gel composition to be rounded or domed to permit maximal pressure to be applied at or near the center of the domed soft gel composition when applied to a target surface.

The heating of steps (b) or (b') can be carried out at about 100 to 250° C., 100 to 200° C., or 100 to 150° C. In some instances, heating is carried out at about 100° C., 150° C., 200° C., or 250° C. The heating time may be within a range of between about 5 to 120 min, 5 to 60 min, 5 to 45 min, or 5 to 30 min. The heating time is sufficient to produce a homogeneous molten mixture. The heating may be carried out under air or may be carried out under inert atmosphere, such as argon or nitrogen.

In some instances, following steps (d) or (e') above, a plurality of particles may be added to the contact surface of the soft gel composition formed according to the methods described. This can be achieved, for example, by a further step of applying an adhesive contact layer where a plurality of particles (as described above) are brushed on or otherwise deposited thereon by any suitable means. In still other instances, the plurality of particles could be brushed on or otherwise deposited directly on the contact surface of the soft gel composition following steps (d) or (e') by any suitable means when the contact surface is itself adhesive and/or tacky.

A. Multifunctional Plasticizers.

The initially soft gel compositions formed by the methods above contain multifunctional plasticizers which can be cured and undergo a polymerization or crosslinking reaction in situ to harden the soft gel. This curing reaction may be activated by exposure to an external stimulus, as already described above.

To effectively transform a high molecular weight thermoplastic polymer into a soft or softened gel composition the amounts of multifunctional plasticizers which can be used in the mixture prepared in step (a) and (a') methods described are typically in the range of between about 50% to 95%, 50% to 90%, 50% to 85%, 50% to 80%, 50% to 75%, 50% to 70%, 50% to 65%, or 50% to 60% by weight to the total weight of the mixture. In some other instances, the weight ratio of thermoplastic polymer-to-multifunctional plasticizer(s) is selected to be about 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, or 1:3. In still some other instances, the weight ratio of thermoplastic polymer-to-multifunctional plasticizer(s) is about 1:1 to about 1:9 and any possible subrange contained therein.

The multifunctional plasticizers which can be used according to the methods described above contain at least two or more functional reactive groups or sites within each molecule. For example, these can be carbon-carbon double bond groups, such as vinyl groups, in styrene, vinyl chloride, butadiene, isoprene, etc. The multifunctional plasticizers with or without stabilizer (vide infra) should be stable to any degree of heating required in preparing or processing the gel compositions. The multifunctional plasticizers can be low molecular weight compounds of less than 2000 Da, 1000 Da, 750 Da, or 500 Da. The multifunctional plasticizers are typically liquid but can in some instances be solid powders.

In some instances, acrylates are preferred because of the availability of broad array and diversity of starting materials containing two or more acrylic groups. In some instances commercially available acrylate polymers can be used. For example, SARTOMER® acrylate monomers: SR238, SR351H and SR 9209A can serve as multifunctional plasticizers. SARTOMER® monomers SR238 and SR9209A are difunctional containing two acrylate groups per molecule whereas SARTOMER® SR351H is trifunctional. The more functional groups the greater the ability to create a more rigid solid structure upon polymerizing. With at least about 50 to 75% or more of the gel composition composed of these multifunctional plasticizers the resulting conversion of the soft gel to a rigid solid hard gel results in a very hard solid replica. The SARTOMER® monomers are believed to be effective as multifunctional plasticizers because they share an aliphatic ester/ether structure. Accordingly, other multifunctional plasticizers which share such an aliphatic ester/ether structure and at least two acrylate functional groups are also envisioned to function as multifunctional plasticizers.

B. Initiators

In addition to the multifunctional plasticizers described above, the soft gel compositions prepared according to the methods above further include one or more initiators, which upon exposure to a stimulus cause the multifunctional plasticizers to react, such as by polymerization or crosslinking, and harden the initially soft gel composition.

In some instances, the initiator is a photoinitiator such as, BAPO, or IRGACURE® 819, having a peak adsorption at 380 nm extending out into the blue region. Any suitable photoinitiator known in the art may be employed. Other exemplary photoinitiators include, but are not limited to, 2,2-dimethoxy-2-phenylacetophenone (DMPA) and diphenyl(2,4,6-trimethylbenzoyl)phosphine oxide (TPO).

In some other instances, thermal free-radical initiators may in some instances also be used such as benzoyl peroxide (BPO) and azobisisobutyronitrile (AIBN).

The amount of the one or more initiators which are added to the mixture of step (a) or (a') is selected to afford a soft gel composition containing the initiator in the range of between about 0.1 to 5, 0.1 to 2.5, 0.1 to 1 percent by weight of the composition. In some instances, the amount is about 0.1, 0.5, 1, 2, 3, 4, or 5 percent by weight of the soft gel composition formed.

Other photoinitiators can include, for example, benzil, a benzoin compound (e.g., a benzoin ether), a benzyl ketal, an α-dialkoxyacetophenone, an α-hydroxyalkylphenones, an α-aminoalkylphenones, an acyl-phosphine oxide, a benzo-phenone, a benzoamine, a thioxanthone, a thioamine, and a titanocene. The photoinitiator can be a cationic photoinitia-tor. In some examples, the photoinitiator can be 2,2-dime-thoxy-2-phenylacetophenone (DMPA), benzoyl peroxide, or 2-hydroxy-2-methyl-1-phenyl-1-propanone (HMPP). The photoinitiator can benzoin, benzoin ethyl ether, benzoin methyl ether, 4,4'-dimethoxybenzoin, 4,4'-dimethylbenzil, 2-benzyl-2-(dimethylamino)-4'-morpholinobutyrophenone, 4'-tert-butyl-2',6'-dimethylacetophenone, 2,2-diethoxyac-etophenone, 2,2-dimethoxy-2-phenylacetophenone, diphe-nyl(2,4,6-trimethylbenzoyl)phosphine oxide/2-hydroxy-2-methylpropiophenone, 4'-ethoxyacetophenone, 3'-hydroxy-acetophenone, 4'-hydroxyacetophenone, 1-hydroxycyclo-hexyl phenyl ketone, 2-hydroxy-4'-(2-hydroxyethoxy)-2-methylpropiophenone, 2-hydroxy-2 -methylpropiophenone, 2-methyl-4'-(methylthio)-2-morpholinopropiophenone, 4'-phenoxyacetophenone, benzophenone, benzophenone-3, 3',4,4'-tetracarboxylic dianhydride, 4-benzoylbiphenyl, 4,4'-bis(diethylamino)benzophenone, 4,4'-bis[2-(1-propenyl) phenoxy]benzophenone, 4-(diethylamino)benzophenone, 4,4'-dihydroxybenzophenone, 4-(dimethylamino)benzophe-none, 3,4-dimethylbenzophenone, 3-hydroxybenzophenone, 4-hydroxybenzophenone, 2-methylbenzophenone, 3-meth-ylbenzophenone, 4-methylbenzophenone, methyl benzoyl-formate, Michler's ketone, bis(4-tert-butylphenyl)iodonium perfluoro-1-butanesulfonate, bis(4-tert-butylphenyl)iodo-nium p-toluenesulfonate, bis(4-tert-butylphenyl)iodonium triflate, Boc-methoxyphenyldiphenylsulfonium triflate, (4-bromophenyl)diphenylsulfonium triflate, (tert-Butoxy-carbonylmethoxynaphthyl)-diphenylsulfonium triflate, (4-tert-Butylphenyl)diphenylsulfonium triflate, dipheny-liodonium hexafluorophosphate, diphenyliodonium nitrate, diphenyliodonium perfluoro-1-butanesulfonate, dipheny-liodonium p-toluenesulfonate, diphenyliodonium triflate, (4-fluorophenyl)diphenylsulfonium triflate, N-hy-droxynaphthalimide triflate, N-hydroxy-5-norbornene-2,3-dicarboximide perfluoro-1-butanesulfonate, (4-iodophenyl) diphenylsulfonium triflate, (4-methoxyphenyl)diph-enylsulfonium triflate, 2-(4-methoxystyryl)-4,6-bis(trichlo-romethyl)-1,3,5-triazine, (4-methylphenyl)diphenylsulfo-nium triflate, (4-methylthiophenyl)methyl phenyl sulfonium triflate, 1-naphthyl diphenylsulfonium triflate, (4-phenoxy-phenyl)diphenylsulfonium triflate, (4-Phenylthiophenyl)di-phenylsulfonium triflate, triarylsulfonium hexafluoroanti-monate salt, triarylsulfonium hexafluorophosphate salt, triphenylsulfonium perfluoro-1-butanesufonate, triph-enylsulfonium triflate, tris(4-tert-butylphenyl)sulfonium perfluoro-1-butanesulfonate, tris(4-tert-butylphenyl)sulfo-nium triflate, anthraquinone-2-sulfonic acid sodium salt monohydrate, 2-tert-butylanthraquinone, camphorquinone, diphenyl(2,4,6-trimethylbenzoyl)phosphine oxide, 9,10-phenanthrenequinone, phenylbis(2,4,6-trimethylbenzoyl) phosphine oxide, 1-chloro-4-propoxy-9H-thioxanthen-9-one, 2-chlorothioxanthen-9-one, 2,4-diethyl-9H-thio-xanthen-9-one, isopropyl-9H-thioxanthen-9-one, 10-meth-ylphenothiazine, or thioxanthen-9-one.

C. Stabilizers

In addition to the multifunctional plasticizers described above, the gel compositions further include one or more stabilizers to prevent premature thermal polymerization when the gel composition is prepared with heating. Two exemplary, but non-limiting, stabilizers include: phenothi-azine, hydroquinone, 4-methoxyphenol, and methylhydro-quinone. Such stabilizers can also be free radical inhibitors. Atmospheric oxygen can also act as a stabilizer to prevent thermal polymerization. Monomers may also be stabilized by the manufacturer. Any suitable stabilizer known in the art may be employed.

The amount of the one or more stabilizers added to the mixture of step (a) or (a') may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more stabilizers which can added to the mixture of step (a) or (a') may be in the range of between about 0.1 to 3, 0.1 to 2.5, 0.1 to 1 percent by weight of the total composition. In some instances, the amount is about 0.1, 0.5, 1, 2, or 3 percent by weight of the total composition.

D. Optional Additives

In some instances, in addition to the multifunctional plasticizers, initiators, and stabilizers described above, the gel compositions may further comprise one or more optional additives including, but not limited to conventional plasti-cizers, such as an oil, diethylsuberate, glyceryltriacetate (triacetin), or acetyltributylcitrate, a tackifier, or any other suitable additives or other constituents. In some instances, the soft gel compositions may exclude any additives listed here or any further additives. In some instances, the soft gel compositions are formed exclusively of thermoplastic poly-mer(s), initiator(s), and stabilizer(s).

The amount of the one or more optional additives which can added to the mixture of step (a) or (a') may be in the range of between about 0.01 to 1000 ppm, 0.01 to 500 ppm, 0.01 to 100 ppm, 0.01 to 50 ppm, 0.01 to 25 ppm, 0.01 to 5 ppm, 0.01 to 1 ppm in the gel composition. In some instances, the amount is about 5 ppm, 50 ppm, 1000 ppm in the gel composition. In certain other instances, the amount of the one or more optional additives which can added to the mixture of step (a) or (a') may be in the range of between about 0.1 to 50, 0.1 to 30, 0.1 to 15, 0.1 to 10, 0.1 to 3, or 1 to 3 percent by weight of the total composition. In some instances, the amount is about 0.1, 0.5, 1, 2, 3, 5, 10, 20, 30, 40, or 50 percent by weight of the total composition.

E. Low Friction and Air Egress

The soft gel compositions may optionally include a con-tact layer 106 which includes a plurality of particles 108 disposed in a pattern coupled on the contact layer 106. In these instances, the methods described above can include an additional step to introduce the particles on a contact surface of the soft gel composition formed. In some instances, the plurality of particles can be adhered to the surface of the soft gel composition by preparing an aqueous polyurethane dispersion to which can be added between the plurality of particles by, for example, a spin coating process. In some other instances, an adhesive can be added to an optional contact layer formed on the contact surface of the soft gel composition and a plurality of particles (as described below) are brushed on or otherwise deposited thereon by any suitable means. The optional contact layer may be formed of an adhesive. In still other instances, the plurality of particles (as described below) can be brushed on or otherwise deposited directly on the contact surface of the soft gel by any suitable means when the contact surface is itself adhesive and/or tacky.

The particles preferably have a hardness greater than the hardness of the soft gel composition so that the particles can retain their shape when the soft gel composition is applied to a target surface with sufficient force to deform the soft gel composition to replicate the surface's topography. The array of particles 108 can create air channels for redistribution and egress of air or other trapped gasses when the soft gel composition is applied to a target surface. In order to retain the structure of air channels, the pattern may usefully form a single layer of the particles on the contact layer 106. The particles may have a Shore A hardness greater than 40, or more generally, greater than a corresponding hardness of the soft gel composition, as defined above and prior to hardening.

Any suitable number of particles can be arranged in a pattern to cover some or all of a contact surface of the soft gel composition. The size and shape of the particles may vary according to an intended use. The diameter of the particles may, for example, be between one and twenty five microns. In general, the pattern of the particles on the contact surface may form a closely spaced array, which may be a regular array, such as a square or hexagonal array, or an irregular array. The pattern may be a substantially hexagonal array, e.g., generally hexagonal with various interstitial irregularities that do not prevent most of the particles from contacting six other adjacent particles. The pattern may also or instead include a plurality of locally hexagonal arrays coupled by other arrays of particles that span the regions between otherwise hexagonal regions. Irregular patterns, may also or instead be used, provided that the particles are sufficiently close to one another to rigidly maintain physical channels there between for egress of gas(ses) when the contact surface of the soft gel composition is pressed/applied against a target surface to be replicated.

The particles may have a variety of size ranges and distributions. In one aspect, the particles are monodisperse, or substantially monodisperse. The particles may more specifically be monodisperse spheres so that the particles tend to arrange within a plane into a substantially hexagonal array. In one aspect, the particles may have an average diameter of about one, two, three, four, five, six, seven, eight, nine, or ten microns. In another aspect, the particles may have an average diameter in a range between three and ten microns, or between one and twenty five microns.

The particles may be formed of a variety of materials including polymers, natural polymers, and minerals. For example, the particles may usefully be formed of, or include, polymethylsilsesquioxane. Polymethyl-silsesquioxane (PMSQ) provides certain advantages when used as particles in the contact surface of the soft gel composition. PMSQ has a relatively low coefficient of friction, it is rigid, and microspheres of PMSQ are readily commercially available in narrow size distributions. However, non-spherical particles may also or instead be used, and the particles may usefully be formed of other types of materials. For example, the particles may be formed of polysilicone, a silica, a glass, a melamine, a polystyrene, a polymethyl-methacrylate, a polybutylmethacrylate, a styrene/acrylate copolymer, a cellulose, and a polylactic acid. The particles may also or instead be formed of a nylon or a polytetrafluoroethylene. More generally, any rigid material that is available in suitable sizes and shapes may be used as particles in a contact surface as contemplated herein. Other suitable and commercially available microparticles include but are not limited to microspheres formed of polysilicone, methyl methacrylate crosspolymer, polybutyl acrylate and silica, lauryl methacrylate/glycol dimethacrylate crosspolymer and acrylates/ethylhexyl acrylate/dimethicone methacrylate copolymer, HDIItrimethylol hexyllactone crosspolymer and silica, HDIItrimethylol hexyllactone crosspolymer and silica, ethylene/acrylic acid copolymer, polyethylene, nylon-6, nylon-12, calcium silicate, vinyl dimethicone/methicone silsesquioxane crosspolymer, and combinations thereof.

The particles may be at least partially embedded in the optional contact layer which is formed of an adhesive, such as a polyurethane. In some instances, the contact layer is the soft gel composition formed or is formed of the same material. In some instances, the particles may extend out of the adhesive in order to benefit from any associated, low coefficient of friction, as well as the resulting interstitial channels, although the amount of the particles extending beyond the adhesive may depend on a number of factors, such as the strength of the adhesive and the shape of the particles. In one aspect, the particles may be spherical particles, and may extend by at least one half of their diameter above the layer of adhesive attaching the particles to the contact layer.

Alternatively or in addition to the particles described above, the contact layer may optionally include non-planar features forming interstitial channels that permit a flow of air between the non-planar features. These non-planar features may have a hardness greater than the initially soft gel composition without affecting the transfer the topography of a target surface into the soft gel composition pressed onto the surface upon contact. The non-planar features may also or alternatively include pillars extending from the contact layer. The hardness of the non-planar features may be greater than the contact layer and the soft gel composition. The non-planar features may generally extend normal to the surface of the optional contact layer, e.g., with vertical walls, or the non-planar features may be curved, angled, or otherwise variably shaped along an axis parallel to the substrate normal. For example, an array of non-planar protrusions can be molded directly into the optional contact layer by constructing a mold of an array of small depressions and filling the depressions with a material that cures to provide a relatively hard surface with a relatively low coefficient of friction. These filled depressions can then be transferred and attached to the optional contact surface layer at which point they form an array of non-planar features providing similar advantages to the particles also described. In some instances, the non-planar features may include tapered structures which, for example, include pyramids, cones, truncated cones, or any other tapered structures or the like.

IV. Methods of Using Gel Compositions

As described above, the soft gel compositions can be cured and undergo a polymerization or crosslinking reaction in situ to harden the soft gel. The polymerization or crosslinking reaction typically employs a free radical reaction by way of the reaction between reactive functional groups, such as vinyl or acrylic groups, present on the multifunctional plasticizers. This reaction may be activated by exposure to an external stimulus, such as by exposure to light, radiation (such as ultraviolet), electron beams, heat, chemical additives, and combinations thereof which induce polymerization or crosslinking of the multifunctional plasticizer components to produce toughening or hardening of the initially soft gel compositions.

Accordingly, a non-limiting method of curing/hardening the soft gel compositions described herein and prepared by either the first or second methods described in Section III above include the step of:

(a''') exposing a soft gel composition to an external stimulus to polymerize and/or crosslink the multifunctional plasticizers and cure the soft gel composition into a hard gel composition.

In still some other instances, the soft gel compositions may be used to form a 3-dimensional replica of a target surface using the soft gel compositions describe in Section III above according to a non-limiting method including the steps of:

(a'''') contacting a soft gel composition to a target surface;

(b'''') pressing the soft gel composition into the target surface, and increasing force and/or repositioning the soft gel as needed to form a total, or substantially total contact with the topography of the target surface;

(c'''') exposing the soft gel composition on the target to an external stimulus to polymerize and/or crosslink the multifunctional plasticizers and cure the soft gel composition into a hard gel composition; and (d'''') removing the hard gel composition from the target surface wherein the hard gel composition forms a hardened topographical replica of the target surface.

The exposing step may proceed by an external stimulus selected from UV light, electron beam, actinic exposure, or other suitable stimulus to induce the polymerization or crosslinking of the multifunctional plasticizers in the soft gel composition. For example, a 10-watt hand held blue light (420 nm to 480 nm) can be used. Step (c''') can be carried out for a period of time ranging from about 0.1 second to 3 minutes, about 0.1 second to 2 minutes, and about 0.1 second to 1 minute, or about 0.1 second to 30 seconds. In some embodiments, the crosslinking reaction occurs instantaneously on exposure to the external stimulus. Forming the total contact may include visual inspection, and any amount of movement, repositioning, increased pressure, and the like suitable for forming substantially total contact, that is, at least 90% contact, or at least about 95%, 96%, 97%, 98%, 99%, or greater contact with the surface, or more generally, sufficient coverage and contact to capture any surface topological features of interest to a user of the gel. This may vary from application to application, according to the required topographical resolution, the intended use of the replica, and so forth.

The hardness of the soft gel composition, prior to curing, may be between about 1 to about 15, about 1 to about 10, about 1 to about 5, or about 5 to about 10 on the Shore A scale. In some instances, the hardness of the soft gel composition is about 1, 2, 3, 4, 5, 6, 7, 8, 9, 10, 11, 12, 13, 14, or 15 on the Shore A scale. In another aspect, the hardness of the soft gel composition, prior to curing, may be between about 0 and 80 on the Shore 00 Scale, or between about 0 and 60 on the Shore 00 Scale. In some instances, the hardness of the soft gel composition is about 0, 10, 20, 30, 40, 50, 60, 70, 80, or 85 on the Shore 00 scale.

By inducing reaction of the multifunctional plasticizers the initially soft gel composition is cured/hardened to a hardness of about between about 60 to about 100, about 70 to about 100, about 80 to about 100, or about 90 to about 100 on the Shore A scale. In some instances, the hardness of the hardened gel composition is about 60, 65, 70, 75, 80, 85, 90, 91, 92, 93, 94, 95, 96, 97, 98, 99, or 100 on the Shore A scale.

The curing reactions between the multifunctional plasticizers present in the soft gel composition can be used to fully cure or a substantially cure the initially soft gel composition to a desired Shore A hardness, wherein "substantially" refers to a percentage of curing of at least about 60%, 65%, 70%, 75%, 80%, 85%, 90%, 91%, 92%, 93%, 94%, 95%, 96%, 97%, 98%, or 99%.

The elasticity or percent elongation of the hard gel composition, when stretched and to a point of increased resistance or rupture, can be at least about 100%, 200%, 300%, 400%, 500%, 600%, 700%, 800%, 900%, 1000%, 1100%, 1200%, or greater.

In some instances, the uncured gel compositions described form part of a device for topographical replication including an optically clear substrate and the uncured gel composition disposed on the optically clear substrate, the gel composition forming an optically clear material and having a Shore 00 hardness between 0 and 80, wherein the gel composition is curable to a Shore A hardness between 60 and 100. The device can further include a material disposed on a surface of the gel composition opposing the optically clear substrate, the material forming a contact surface for the device. The contact surface of the device can include a plurality of air channels to facilitate egress of air (as described above) when the contact surface is placed against a target surface for topographical reproduction. The material of the contact surface preferably has a lower coefficient of friction than that of the gel composition. The contact surface can include a plurality of particles with a Shore A hardness greater than 40. A side of the contact surface facing the gel composition may be opaque in some instances. The gel composition is, as described in detail herein, photocurable to the Shore A hardness of between 60 and 100, where the gel composition is photocurable via an external stimulus, such as by exposure to ultraviolet light.

As a further use, soft gel compositions may be formed or cast into a mold and cured to final desired shape by a method including the steps of:

(i) mixing one or more thermoplastic polymers; one or more multifunctional plasticizers; one or more initiators; and optionally one or more stabilizers;

(ii) heating the mixture to form a molten composition;

(iii) casting the molten composition into a mold;

(iv) optionally allowing the molten composition to cool to form a soft gel composition;

(v) exposing the mixture or the soft gel composition to an external stimulus to polymerize and/or crosslink the multifunctional plasticizers and cure the soft gel composition into a hard gel composition; and (e') removing the mold to release the soft gel composition having the shape of the mold.

EXAMPLES

The present invention will be further understood by reference to the following non-limiting examples.

Example 1

Materials:
Polyurethane:

BASF ELASTOLLAN® EXP BCF35A12PTSG, which is a proprietary material which contains polyester linkages on the polyol component and is known to be plasticized by 15 to 20% by weight of acetyltributylcitrate, was used. It has a Shore A hardness of 35 as produced commercially and is one of the softest ELASTOLLAN® polyurethanes commercially available.

Multifunctional Plasticizers:

Two SARTOMER® monomers: (1) SR238 hexanediol-diacrylate and (2) SR9209A ethoxylated neopentyl glycol diacrylate were used as multifunctional plasticizers. Both are difunctional with two acrylate groups per molecule.

Photoinitiator:

The photoinitiator, BAPO, or IRGACURE® 819, was used. It has a peak adsorption at 380 nm which it extends out into the blue region.

Stabilizer:

Two stabilizers: (1) phenothiazine and (2) methylhydroquinone were used to prevent thermal polymerization. Atmospheric oxygen can also act as a stabilizer to prevent thermal polymerization. Monomers may also be stabilized by the manufacturer. SARTOMER® typically uses a combination of hydroquinone and methylhydroquinone to stabilize monomers.

Methods:

Soft Gel Replica Pads:

The following ingredients were weighed out: 6 grams of BASF ELASTOLLAN® EXP BCF35A12PTSG; 4.5 grams SARTOMER® SR238; 1.5 grams SARTOMER® SR9209A; 0.15 grams Phenothiazine; 0.15 grams Methylhydroquine; and 0.1 grams BAPO. The ingredients were placed into an oven at 390° F. The polyurethane melted in about 20 minutes and the resulting mixture was mixed and returned to the oven to allow bubbles to be expelled. In about 30 minutes the gel was ready for casting.

Separately a mold is created by drilling 1.5 inch holes into a 3 mm thick Teflon sheet and the drilled sheet was clamped to a glass plate creating wells into which the above mixture was poured. A 1.5 inch diameter ¼" thick polymethylmethacrylate (PMMA) support disc was placed on top of the molten mixture in each well and the mold and contents allowed to cool. After cooling, the Teflon mold was removed and cylindrical soft gel pads were formed and stripped from the glass plate with the PMMA support in place.

The resulting soft gel pad on the PMMA disc was optically clear and the surface was free of liquid or other material. The formed gel was a soft gel to the touch. The process described created a 3 mm thick replicating soft gel layer.

An optional low friction layer formed of hard polysilicone 6 micron diameter mono dispersed microspheres were brushed onto the soft gel pad surface. The surface is slightly tacky which facilitated adhesion of the microspheres. With care, a monolayer of a regular array of microspheres were deposited onto the surface of the soft gel.

Replication Process:

The initially soft gel on PMMA substrate with the low friction surface was pressed against a target surface to be replicated. The microspheres are translucent and so the surface initially viewed through the soft gel and support was blurred and hazy but the image of the target surface became clear and sharpened as the microspheres contacted the surface to be replicated. The soft gel was repositioned, as needed, until the area to be replicated was observed clearly through the transparent support. The initially soft gel composition was then illuminated with UV or blue light (a 10-watt hand held blue light (420 nm to 480 nm) for a sufficient amount of time to induce the multifunctional plasticizers in the gel to react and rigidify to harden and solidify the gel composition into a hard gel composition and form a 3D replica of the target surface topography.

Results:

Table 1 below lists the combination of one SARTOMER® acrylic monomer (SR238, SR351H, or SR9209A) used with BASF Polyurethane ELASTOLLAN® Soft35A 12P000 to create replica soft gel pads on PMMA substrates. The ratio by weight of the polyurethane to acrylate was 1 to 1.33 or 57%. The softness/hardness of the gel and resulting solid replica was characterized by a durometer measurement. In each of the cases listed in Table 1, the hardness was measured from 1 to 6 on the Shore A scale. The elasticity of each gel was about 500 to 700%. Strips approximately 1 cm wide and 3 to 5 mm thick of the gel pads could be stretched to about 500% to 700% before reaching a point of significantly increased resistance.

The 3D replica solid after curing was measured to have a hardness from 70 to 100 on the same Shore A scale

TABLE 1

| | | Sartomer Acrylates | | |
|---|---|---|---|---|
| Test # | BASF Polyurethane | Sartomer Acrylate | chemical structure | Weights PU:Acrylate |
| 87 | Soft 35A | SR238 | 1,6 hexanedioldiacrylate | 1:1.33 |
| 91 | " | SR351H | trimethylol propane triacrylate | 1:1.33 |
| 90 | " | SR9209A | neopentyl ethoxylated diacrylate | 1:1.33 |

Table 2 lists various BASF ELASTOLLAN® polyurethanes (EXP BCF35A12PTSG, 1170A10, Soft 35A, Soft 45A, or 1160A13P) with three SARTOMER® acrylates (SR238, SR351H, SR9209A), as indicated below, were used to form replica gel pads. Durometer measurements for each gel and each resulting 3D replica hardened solid is listed along with the weights of each material and a calculated weight ratio of polyurethane, polyurethane to weight of acrylate monomer. The elasticity measured for each gel is also listed.

TABLE 2

| | | BASF Polyurethanes | | | | | |
|---|---|---|---|---|---|---|---|
| Test # | BASF Polyurethane Elastolian # | Sartomer Acrylate Monomer #1 | Sartomer Acrylate Monomer #2 | PU: Acrylayte | Gel Shore A | Elasticity % elongation | Solid Shore A |
| | EXP BCF35A12PTSG weight, g | SR238 weight, g | SR9029A weight, g | | | | |
| 109 | 6 | 9 | 3 | 1:2 | 1 to 2 | >1100% | 95 |
| 108 | 6 | 6 | 2 | 1:1.33 | 6 to 8 | >1100% | 83 |
| | 1170A10 weight, g | SR238 weight, g | SR9209A weight, g | | | | |

TABLE 2-continued

| | | | | | BASF Polyurethanes | | | |
| Test # | BASF Polyurethane Elastolian # | Sartomer Acrylate Monomer #1 | Sartomer Acrylate Monomer #2 | PU: Acrylayte | Gel Shore A | Elasticity % elongation | Solid Shore A |
| --- | --- | --- | --- | --- | --- | --- | --- |
| 107 | 3 | 6.75 | 2.25 | 1:3 | 2 to 4 | 700% | 95 |
| 99 | 3 Soft 35A | 4.5 | 1.5 | 1:2 | 7 | 700% | 97 |
| 95 | 3 Soft 45A | 3 | 1 | 1:1.33 | 3 to 4 | 700% | 70 to 90 |
| 102 | 3 1160A13P | 4.5 | 1.5 | 1:2 | 2 to 4 | >400% Rupture | 98 |
| 103 | 3 Soft 35A | 4.5 | 1.5 | 1:2 | 2 to 4 | 400% | 95 to 100 |
| 94 | 3 | 1.5 | 2.5 | 1:1.33 | 1 to 2 | not measured | 82 |

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A method of forming a 3-dimensional replica of a target surface with a gel composition, the method comprising:

providing a gel composition on an optically clear substrate, the gel composition forming an optically clear material including one or more thermoplastic polymers or elastomers, one or more multifunctional plasticizers, and one or more initiators, wherein the gel composition is a curable gel composition formed of a soft gel having a Shore 00 hardness between 5 and 80, wherein the optically clear substrate is a rigid substrate, and wherein upon exposure to an external stimulus the gel composition cures from the soft gel to a Shore A hardness of at least 50;

contacting the gel composition to a target surface with an application of force applied through the optically clear substrate;

exposing the gel composition on the target surface to the external stimulus to polymerize and/or crosslink the one or more multifunctional plasticizers and to cure the gel composition into a hard gel composition having a Shore A hardness of at least 50; and removing the hard gel composition from the target surface to provide a topographical replica of the target surface in the hard gel composition.

2. The method of claim 1, wherein the gel composition is curable to a Shore A hardness of at least 60.

3. The method of claim 1, wherein the gel composition includes a material disposed on a surface thereof opposing the optically clear substrate, the material forming a contact surface for contacting the target surface.

4. The method of claim 3, wherein the contact surface includes a plurality of air channels to facilitate egress of air when the contact surface is placed against the target surface for topographical reproduction.

5. The method of claim 3, wherein the material of the contact surface has a lower coefficient of friction than the gel composition.

6. The method of claim 3, wherein a side of the contact surface facing the gel composition is opaque.

7. The method of claim 3, wherein the contact surface includes a plurality of particles with a Shore A hardness of at least 40.

8. The method of claim 7, wherein the plurality of particles having an average diameter less than 10 microns.

9. The method of claim 1, wherein the gel composition is photocurable with ultraviolet light to the Shore A hardness of at least 60.

10. The method of claim 1, wherein the gel composition is photocurable to a Shore A hardness of at least 90.

11. The method of claim 1, wherein the external stimulus to cure the gel composition includes heat.

12. The method of claim 1, wherein the external stimulus to cure the gel composition includes chemical additives.

13. The method of claim 1, wherein the external stimulus to cure the gel composition includes light.

14. The method of claim 1, wherein the optically clear substrate includes a polycarbonate.

15. The method of claim 1, wherein the optically clear substrate includes one or more of an acrylate and a glass.

16. The method of claim 1, wherein the one or more thermoplastic polymers or elastomers are selected from a group consisting of polyurethanes, siloxanes, silicone rubbers, polyamides, polyesters, polyolefins, natural rubbers, and mixtures thereof.

17. The method of claim 1, wherein the one or more thermoplastic polymers or elastomers includes a polyurethane elastomer.

18. The method of claim 1, wherein the gel composition is optically clear and transmits all or substantially all visible light through the gel composition.

19. The method of claim 1, wherein the hard gel composition cured from the gel composition is optically clear.

20. The method of claim 1, wherein the gel composition includes one or more stabilizers to inhibit thermal polymerization of the gel composition, the one or more stabilizers including at least one of phenothiazine, hydroquinone, 4-methoxyphenol, and methylhydroquinone.

21. The method of claim 1, wherein the gel composition has a thickness between 0.1 millimeters and 3 millimeters.

* * * * *